Patented Oct. 18, 1938

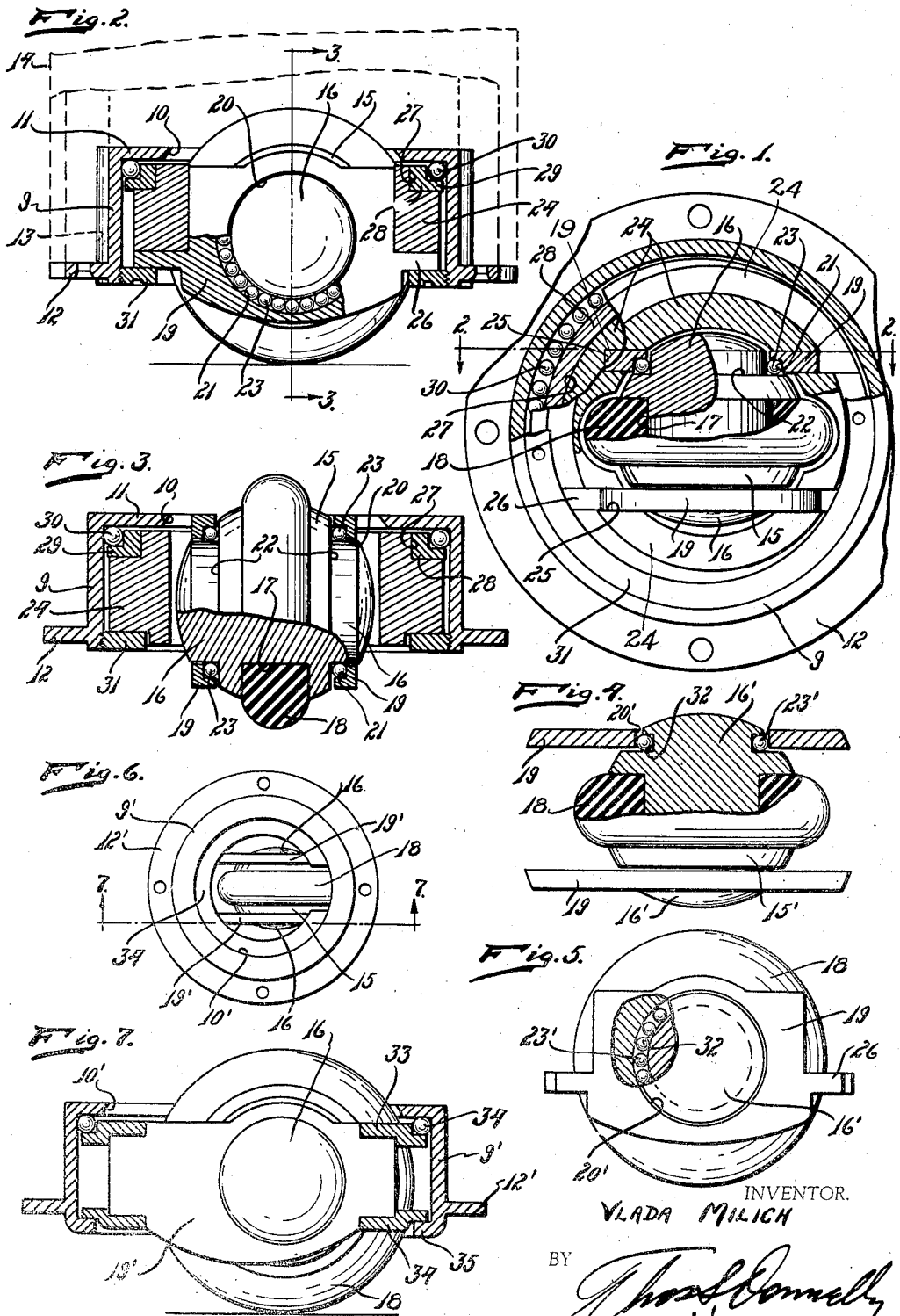

2,133,826

UNITED STATES PATENT OFFICE 2,133,826

CASTER

Vlada Milich, Detroit, Mich.

Application April 29, 1936, Serial No. 76,910

3 Claims. (Cl. 16—20)

My invention relates to a new and useful improvement in a caster adapted for mounting on furniture, hand trucks, and the like and has for its object the provision of a caster which will be simple in structure, economical of manufacture, durable and highly efficient in use.

Another object of the invention is the provision in a caster in which free swivelling of the traction member may be effected so that movement of the body on which the caster is to be mounted in either direction may be easily and quickly effected.

Another object of the invention is the provision of a caster so constructed and arranged that it may be very easily and quickly assembled and disassembled and the various parts removed individually.

Another object of the invention is the provision of a caster having a traction member mounted in a suitable frame, so arranged that the traction member and its supporting frame may be removed from the supporting body as a unit.

Other objects will appear hereinafter.

The invention consists in the combination and arrangement of parts hereinafter described and claimed.

The invention will be best understood by a reference to the accompanying drawing which forms a part of this specification, and in which, Fig. 1 is a bottom plan view of the invention with parts broken away and parts shown in section.

Fig. 2 is a sectional view taken on line 2—2 of Fig. 1.

Fig. 3 is a sectional view taken on line 3—3 of Fig. 2.

Fig. 4 is a fragmentary view of a slightly modified form of the invention with parts broken away and parts shown in section.

Fig. 5 is a side elevational view of the assembly shown in Fig. 4 with parts broken away and parts shown in section.

Fig. 6 is a top plan view of a further modified form of the invention.

Fig. 7 is a sectional view taken on line 7—7 of Fig. 6.

In the form shown in Fig. 1 I have indicated the caster as comprising a cup-shaped retainer 9 having the opening 10 formed in its base 11 and provided, adjacent its open end, with the outwardly projecting flange 12. This retainer is adapted for insertion into the opening 13 formed in the supporting body 14 and the flange 12 engages against the face of this body 14 so that screws or other securing means may be projected through the flange into the body 14. The traction member comprises a ball shaped body 15 having the diametrically opposed trunnions 16 positioned outwardly from opposite sides thereof. A circumferential groove 17 is formed in this body 15 and molded therein is a tire or rim 18 formed from rubber or other suitable sound-deadening material. I provide a pair of side plates 19, these side plates being substantial duplicates of each other and being provided with openings 20 through which the trunnions 16 may project. Each of the plates is recessed as at 21 on its inner face surrounding the opening 20 to provide with the shoulder 22 of the body 15 a raceway for the ball bearings 23. An annular member 24 is provided with axially directed grooves 25 on its inner face in which the ends of the side plates 19 engage. Each of these side plates is provided at opposite ends with an outwardly projecting tongue 26 which overlies and engages against the undersurface of the ring 24, as clearly shown in Fig. 2. The inner face of the ring 24 at its circumference is cut away as at 27 and seated in this recess is a ring 28 having the outwardly projecting flange 29 to form with the base 11 of the retainer a raceway for the balls 30. Threaded into the open end of the cup-shaped retainer is the locking ring 31 which engages against the tongues 26 and serves to retain the flange 29 in position to press the balls 30 against the inner surface of the base 11. It will thus be noted that the traction member or body 15 is rotatable on the balls 23 so that the ring 24 carrying with it the traction member is rotatable on the balls 30.

To assemble the device is a very simple operation which is believed obvious from the description given. Upon removal of the retainer 9 from the supporting body 14, the cup-shaped retainer 9 may be inverted from the position shown in Fig. 2. Upon removing the locking ring 31, the side plates carrying with them the traction member may be lifted out of the grooves in the ring 24.

A caster formed in this manner has been proven most durable in construction and efficient in operation in that a maximum freedom of the traction member is afforded.

In the form shown in Fig. 4, the construction is the same as that shown in Figs. 1, 2 and 3 excepting that the trunnions 16', which correspond to the trunnions 16 in Fig. 1, are provided with a circumferential groove 32 in which the balls 23', corresponding to the balls 23, engage so that the recessing shown at 21 in Fig. 3 is eliminated in the side plates which are used in the form shown in Fig. 4.

In Fig. 6 and Fig. 7 I have shown a simplified type of structure in which the ring 24 is eliminated. In this form the side plates 19' are embraced at their outer ends by the rings 33 and 34 which are welded thereto, so that these side plates 19' are retained in position on the trunnions 16. The upper ring 33 engages the balls 34 and the cup-shaped retainer 9' provided with the outwardly projecting flange 12' is crimped as at 35 around the lower ring 34 to lock the parts in position. In this type of construction a light device is provided, while the desired durability is still present as the device may, if desired, be made from stampings.

It will be noted that in all of the forms the traction member and side plates are assembled as a unit together and may be inserted as a unit in the retainer with which the same are to be used, thus obviating the losing of the balls which might otherwise result were the side plates to be removed from the trunnions.

While I have illustrated and described the preferred form of construction, I do not wish to limit myself to the precise details of structure shown, but desire to avail myself of such modifications and variations as may come within the scope of the appended claims.

Having thus described my invention, what I claim as new and desire to secure by Letters Patent is:

1. A caster of the class described, comprising: a hollow retainer adapted for mounting on a supporting body; an annular traction member; trunnion forming members fixed on and projecting outwardly from opposite sides of said traction member; a pair of separate side plates, each of said side plates having an opening formed therein for the reception of one of said trunnion forming members; an annular member surrounding said plates and secured thereto, said annular member being adapted for reception into said retainer; and means on said retainer for retaining said annular member inserted therein.

2. A caster of the class described, comprising: a hollow retainer; an annular traction member; a pair of trunnion forming members, each fixed relatively to and projecting outwardly from one side of said traction member diametrically thereof; a pair of separate side plates, each having an opening for the reception of one of said trunnions; a plurality of anti-friction members positioned between each of said trunnions and the plate through which projected; means cooperating with said side plates and said trunnions for retaining said anti-friction members in position; an annular member surrounding said plates and secured to each of the same at the opposite ends thereof for connecting said plates together and retaining the same in position on said trunnions, said annular member and said plates being insertable into said retainer; and means on said retainer for retaining said annular member and said plates inserted in said retainer.

3. A caster of the class described, comprising: a hollow retainer; an annular traction member; a pair of trunnion forming members, each projecting outwardly from one side of and fixed relatively to said traction member, diametrically thereof; a pair of separate side plates, each of said plates having an opening formed therein for the reception of a trunnion forming member; a separate annular member surrounding said plates and secured to each of said plates, adjacent their ends, for connecting said plates together and retaining the same in position on said trunnion forming members, said annular member and said plates being insertable into said retainer; and a member projecting radially inwardly of said retainer, adjacent one end, for retaining said annular member and said plates positioned therein.

VLADA MILICH.